United States Patent
Ikuta et al.

(10) Patent No.: US 9,307,750 B2
(45) Date of Patent: Apr. 12, 2016

(54) PINION GEAR FOR DUAL-BEARING REEL AND DUAL-BEARING REEL INCLUDING SAME

(71) Applicant: Shimano Inc., Sakai, Osaka (JP)

(72) Inventors: Takeshi Ikuta, Osaka (JP); Akira Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 68 days.

(21) Appl. No.: 14/149,198

(22) Filed: Jan. 7, 2014

(65) Prior Publication Data
US 2014/0231570 A1 Aug. 21, 2014

(30) Foreign Application Priority Data

Feb. 18, 2013 (JP) .................................. 2013-028804

(51) Int. Cl.
*A01K 89/01* (2006.01)
*A01K 89/015* (2006.01)

(52) U.S. Cl.
CPC .................................... *A01K 89/015* (2013.01)

(58) Field of Classification Search
CPC ........... A01K 89/0186; A01K 89/0189; A01K 89/0191; A01K 89/015
USPC .......................... 242/257, 259, 260, 261, 262
See application file for complete search history.

(56) References Cited

U.S. PATENT DOCUMENTS

| | | | | |
|---|---|---|---|---|
| 5,855,330 | A | * | 1/1999 | Kobayashi .................... 242/261 |
| 5,875,986 | A | * | 3/1999 | Miyazaki et al. ............. 242/261 |
| 5,904,310 | A | * | 5/1999 | Miyazaki ...................... 242/260 |
| 6,270,028 | B1 | * | 8/2001 | Kim et al. ..................... 242/262 |
| 2003/0111569 | A1 | * | 6/2003 | Hitomi .......................... 242/321 |
| 2004/0144876 | A1 | * | 7/2004 | Oishi et al. .................... 242/257 |
| 2005/0056716 | A1 | * | 3/2005 | Kawasaki ..................... 242/310 |
| 2007/0181728 | A1 | * | 8/2007 | Kawasaki ..................... 242/310 |
| 2009/0250541 | A1 | * | 10/2009 | Tsutsumi ...................... 242/257 |
| 2011/0057063 | A1 | * | 3/2011 | Kawasaki ..................... 242/283 |
| 2012/0223173 | A1 | * | 9/2012 | Niitsuma et al. .............. 242/322 |

FOREIGN PATENT DOCUMENTS

| | | | | |
|---|---|---|---|---|
| JP | 09177940 | A | * 7/1997 | ............. F16H 48/20 |
| JP | 2009-82027 | A | 4/2009 | |

* cited by examiner

*Primary Examiner* — Emmanuel M Marcelo
(74) *Attorney, Agent, or Firm* — Global IP Counselors

(57) ABSTRACT

A pinion gear for a dual-bearing reel, the pinion gear is configured to be meshed with a drive gear. The pinion gear includes a first support portion, a gear portion, a clutch control portion, and a plated coating. The first support portion is supported by the reel unit through a first bearing. The first support portion is rotatable and axially movable with respect to the first bearing. The gear portion is configured to be meshed with the drive gear. The first support portion is disposed on a first side of the gear portion. The clutch control portion is disposed between the first support portion and the gear portion. The clutch control portion includes an outer diameter smaller than that of the first support portion and an outer diameter of the gear portion. The plated coating is formed on at least an outer peripheral surface of the first support portion.

7 Claims, 8 Drawing Sheets

PINION GEAR FOR DUAL-BEARING REEL AND DUAL-BEARING REEL INCLUDING SAME

CROSS-REFERENCE TO RELATED APPLICATIONS

This application claims priority to Japanese Patent Application No. 2013-028804 filed on Feb. 18, 2013. The entire disclosure of Japanese Patent Application No. 2013-028804 is hereby incorporated herein by reference.

BACKGROUND

1. Field of the Invention

The present invention relates to a dual-bearing reel configured to forwardly reel out a fishing line and a pinion gear for the dual-bearing reel.

2. Background Art

A dual-bearing reel is provided with a clutch mechanism for switching between a coupled state of allowing transmission of handle rotation to a spool and a decoupled state of preventing transmission of handle rotation to the spool. The clutch mechanism is composed of a clutch pin and a pinion gear. The clutch pin is attached to a spool shaft. The pinion gear is a tubular member having a groove to be engaged with the clutch pin. The pinion gear is configured to be moved in a spool shaft direction, and thereby functions as a clutch mechanism. Further, the pinion gear is meshed with a drive gear configured to be rotated in conjunction with a handle, and thereby functions also as a rotation transmission mechanism configured to rotate the spool. The pinion gear is mounted to the outer peripheral side of the spool shaft, while being rotatable and axially movable. Japan Laid-open Patent Application Publication No. JP-A-2009-82027 describes an exemplary well-known dual-bearing reel with a structure that the pinion gear is supported by bearings for enhancing the fishing-line winding performance of the spool. The well-known dual-bearing reel includes a pair of bearings and a pair of collars. The bearings are disposed on the both ends of the pinion gear. The collars are tubular members made of synthetic resin, and are respectively disposed radially between the bearings and the pinion gear. With the structure, slide resistance can be reduced when the pinion gear is axially moved in a clutch operation. Operating force required in the clutch operation can be thereby reduced.

SUMMARY

The well-known dual-bearing reel, which has the structure that the collars are disposed radially between the bearings and the pinion gear, is required to either increase the inner diameters of the bearings or reduce the outer diameter of the pinion gear by the amounts corresponding to the thicknesses of the collars. However, when the inner diameters of the bearings are increased, the sizes of the bearings are inevitably increased. On the other hand, when the outer diameter of the pinion gear is reduced, the strength of the pinion gear is inevitably deteriorated.

It is an adavantage of the present invention to smoothly move a pinion gear supported by a reel unit through a bearing in the axial direction without increase in size of the bearing and deterioration in strength of the pinion gear.

A pinion gear for a dual-bearing reel, the pinion gear is configured to be meshed with a drive gear. The drive gear is configured to transmit rotation of a handle rotatably mounted to a reel unit of the dual-bearing reel to a spool. The pinion gear includes a first support portion, a gear portion, a clutch control portion, and a plated coating. The first support portion is supported by the reel unit through a first bearing. The first support portion is rotatable and axially movable with respect to the first bearing. The gear portion is disposed away from the first support portion at an interval. The gear portion is configured to be meshed with the drive gear. The first support portion is disposed on a first side of the gear portion. The clutch control portion is disposed between the first support portion and the gear portion. The clutch control portion includes an outer diameter smaller than an outer diameter of the first support portion and an outer diameter of the gear portion. The plated coating is formed on at least an outer peripheral surface of the first support portion.

BRIEF DESCRIPTION OF THE DRAWINGS

Referring now to the attached drawings which form a part of this original disclosure.

DETAILED DESCRIPTION OF PREFERRED THE EMBODIMENTS

Figure 1:
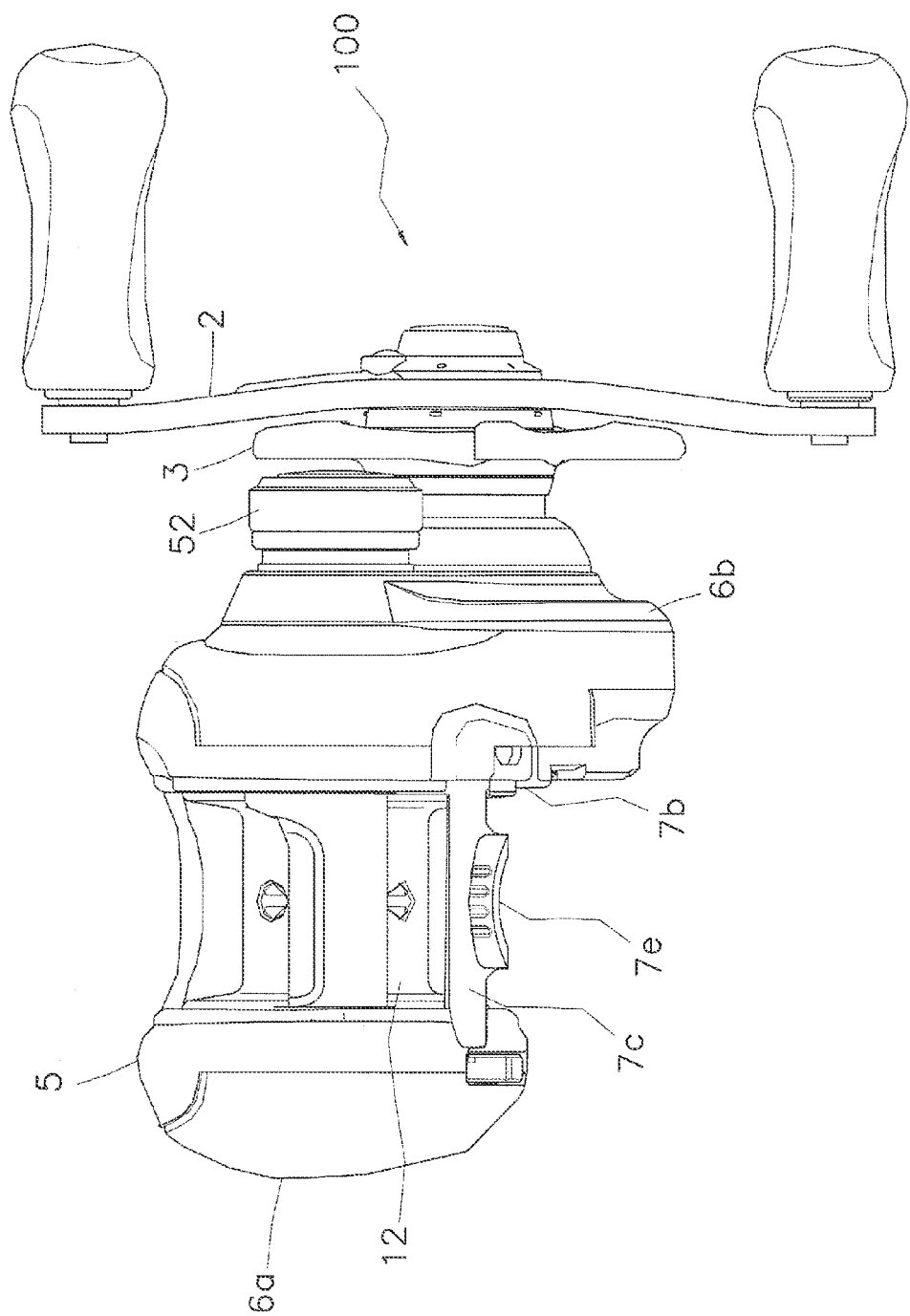
FIG. 1 is a rear view of a dual-bearing reel according to an exemplary embodiment of the present invention.
Figure 2:
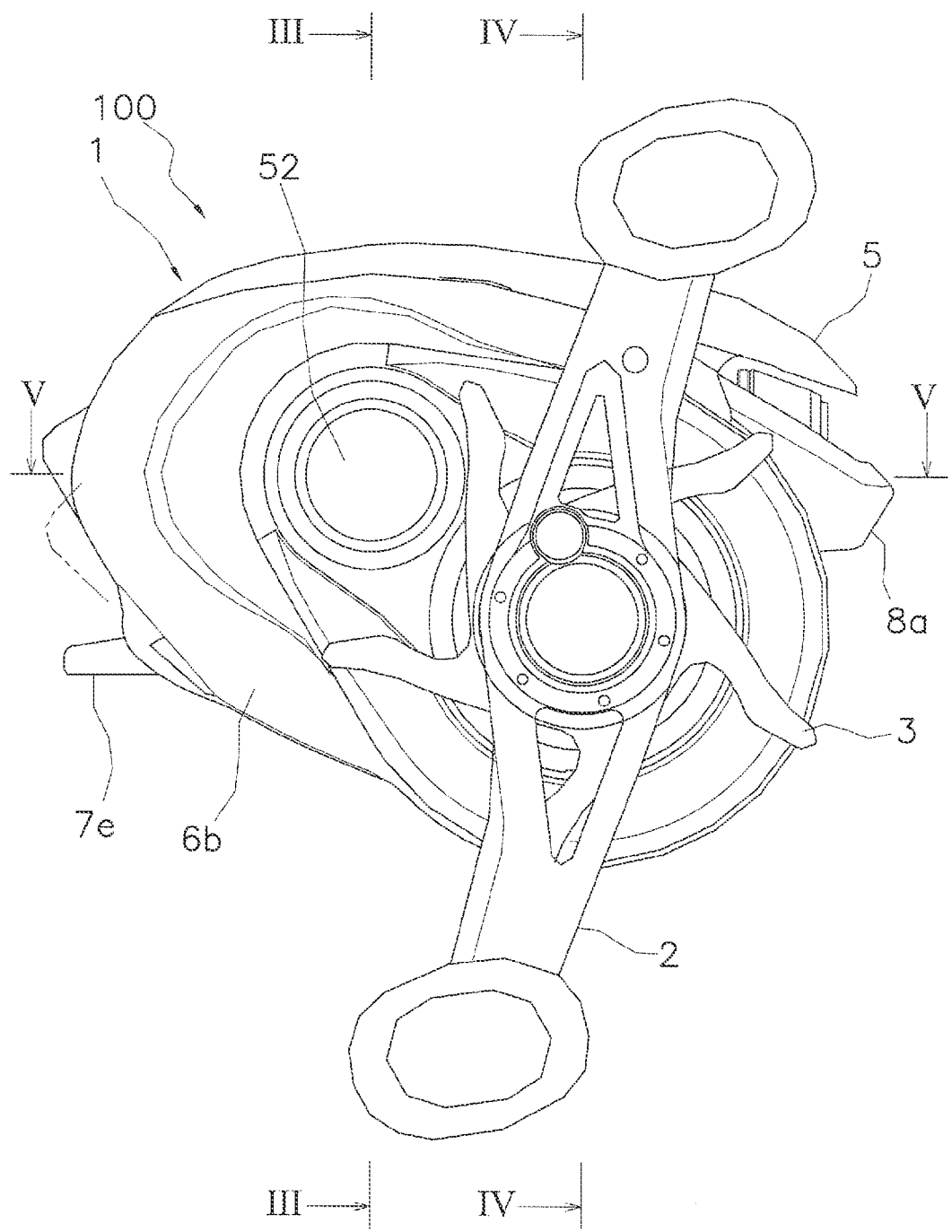
FIG. 2 is a side view of the dual-bearing reel seen from a handle side.

As illustrated in FIGS. 1 and 2, a dual-bearing reel 100 employing a first exemplary embodiment of the present invention is a compact low-profile reel for bait-casting. The dual-bearing reel 100 includes a reel unit 1, a handle 2 for spool rotation, and a star drag 3 for drag force regulation. The handle 2 is disposed laterally to the reel unit 1. The star drag 3 is disposed on the reel unit 1 side of the handle 2. Further, the dual-bearing reel 100 includes a spool 12 for winding a fishing line, a spool shaft 16, a rotation transmission mechanism 18, a clutch mechanism 13, and a drag mechanism 21.

Reel Unit

As illustrated in FIGS. 1, 3, 4, 5, and 6, the reel unit 1 includes a frame 5, a first side cover 6a, and a second side cover 6b. The first and second side covers 6a and 6b cover the both lateral sides of the frame 5. The reel unit 1 further includes a front cover 8a and a shaft support part 8b. The front cover 8a covers the front side of the frame 5. The shaft support part 8b is fixed to the first side cover 6a by screws or the like.

The frame 5 has a first side plate 7a, a second side plate 7b, and a plurality of coupling portions 7c. The first side plate 7a is disposed on the opposite side of the handle 2. The second side plate 7b is disposed in opposition to the first side plate 7a on the handle 2 side. The coupling portions 7c couple the first side plate 7a and the second side plate 7b. An opening 7d is bored in the first side plate 7a such that the spool 12 can pass therethrough. The shaft support part 8b is detachably coupled to the opening 7d. The upper side one of the coupling portions 7c is used as a thumb rest. The lower side one of the coupling portions 7c is integrally formed with a fishing-rod attachment portion 7e.

Figure 6:
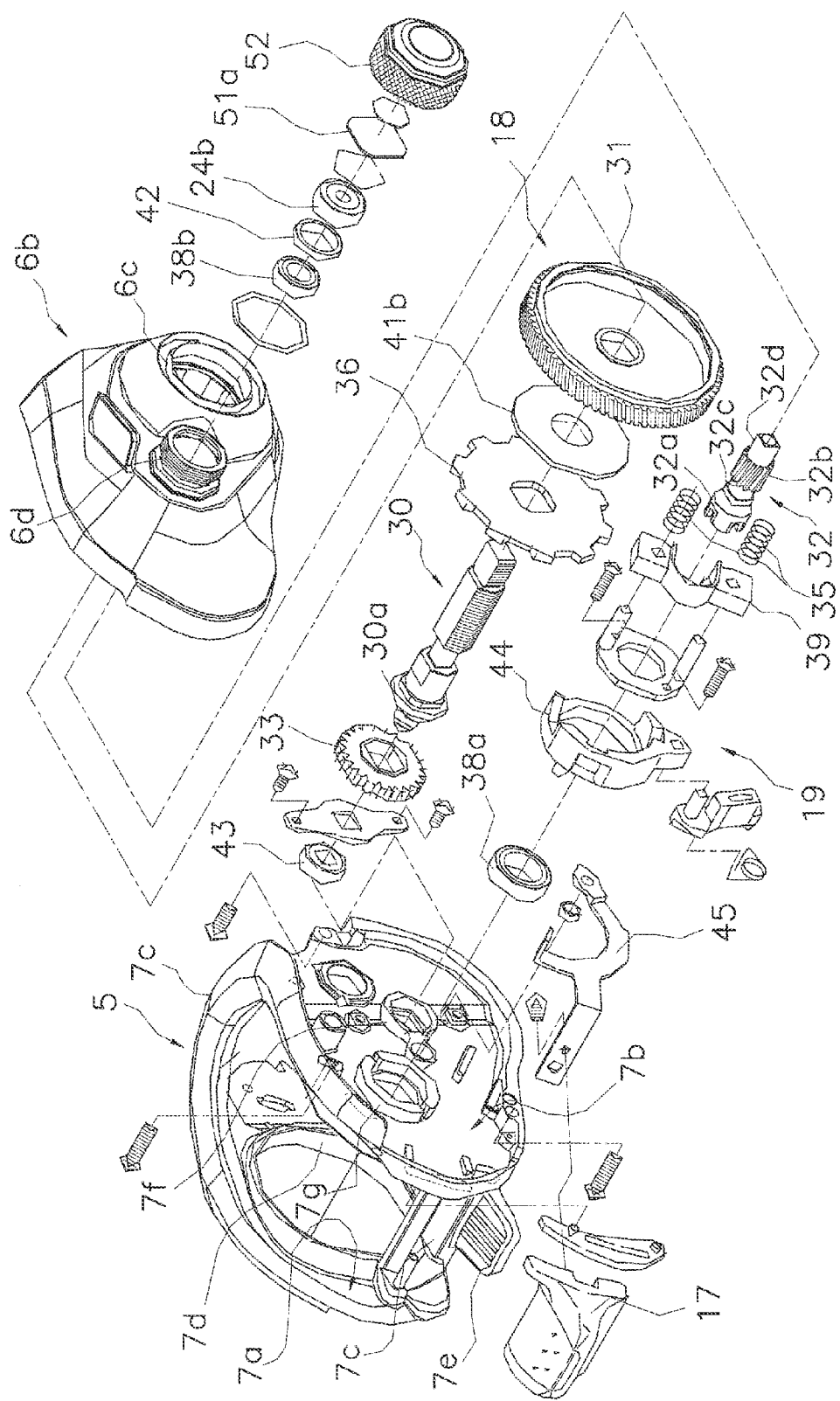
FIG. 6 is an exploded perspective view of components including a rotation transmission mechanism and a clutch mechanism.

The spool 12 for winding the fishing line is rotatably and detachably mounted between the first and second side plates 7a and 7b of the reel unit 1. As illustrated in FIG. 6, the second side plate 7b has a first boss 7f and a second boss 7g. Each of the first and second bosses 7f and 7g has a through hole. The first boss 7f is formed for supporting the base end of a drive shaft 30 (to be described) onto which the handle 2 is coupled such that the drive shaft 30 is rotatable. The second boss 7g is formed for supporting a pinion gear 32 such that the pinion gear 32 is rotatable and axially movable.

Figure 4:
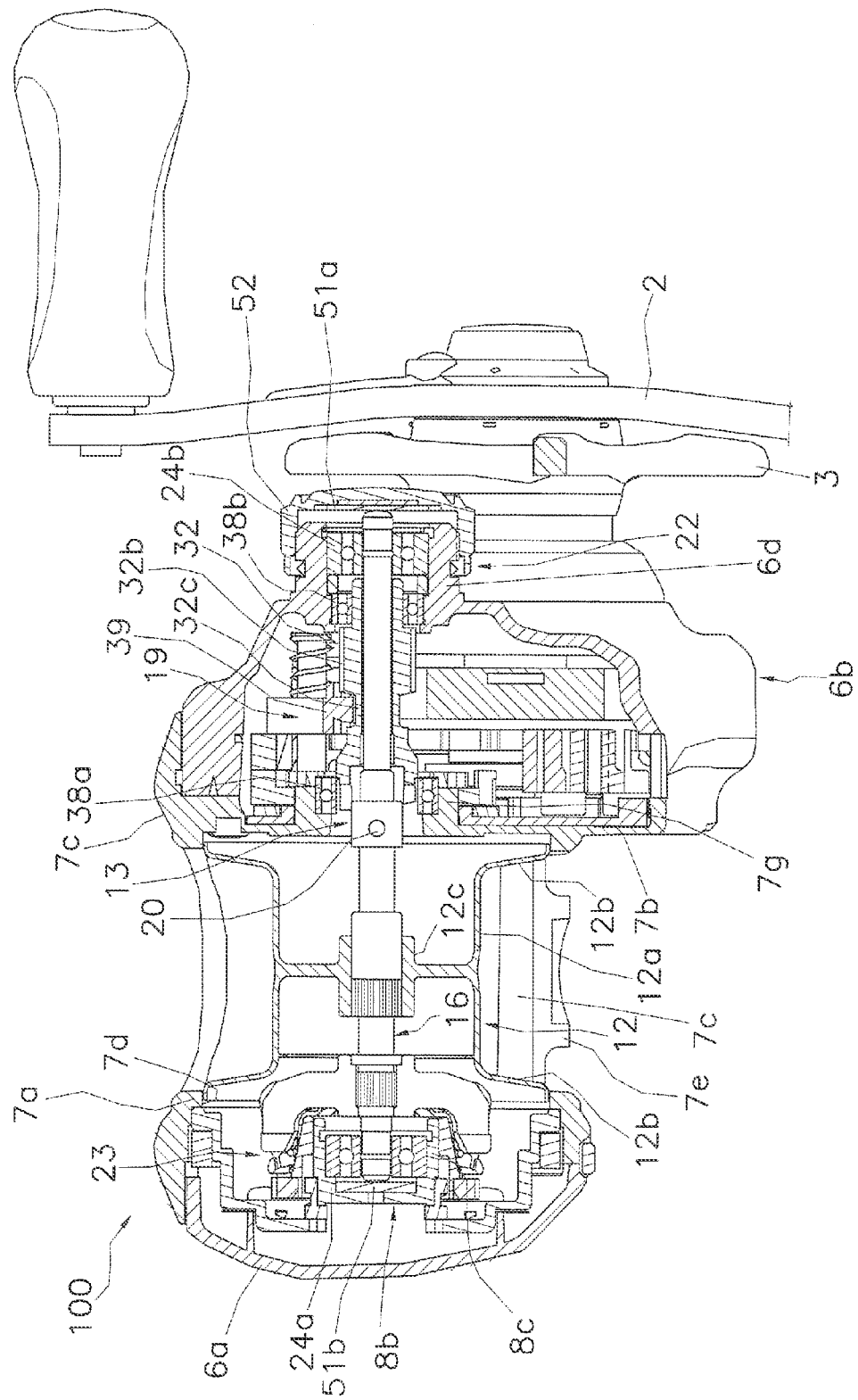
FIG. 4 is a cross-sectional view of the dual-bearing reel taken along a cutaway line IV-IV in FIG. 2.

As illustrated in FIG. 4, the first side cover 6a is detachably coupled to the first side plate 7a through the shaft support part 8b. As illustrated in FIG. 6, the second side cover 6b has a third boss 6c and a fourth boss 6d. The third boss 6c is provided for supporting the drive shaft 30 in a rotatable state. The fourth boss 6d is provided for supporting the pinion gear 32 and the spool shaft 16 onto which the spool 12 is fixed.

As illustrated in FIG. 4, the shaft support part 8b is a closed-end tubular member. The shaft support part 8b has a tubular bearing accommodation portion 8c in the inner peripheral part thereof. The bearing accommodation portion 8c accommodates a bearing 24a in the inside thereof. The bearing 24a supports an end of the spool shaft 16.

Figure 3:
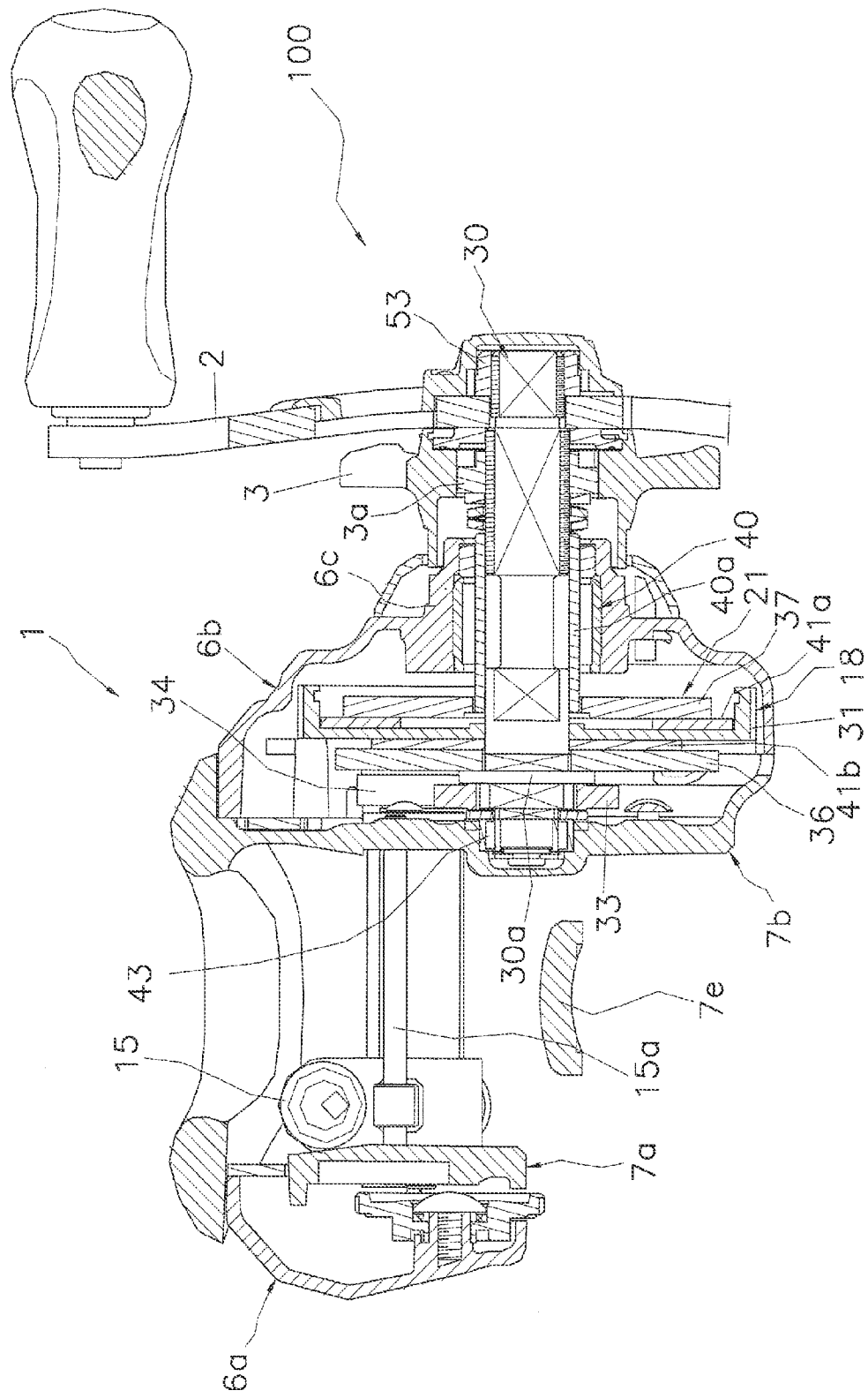
FIG. 3 is a cross-sectional view of the dual-bearing reel taken along a cutaway line III-III in FIG. 2.
Figure 5:
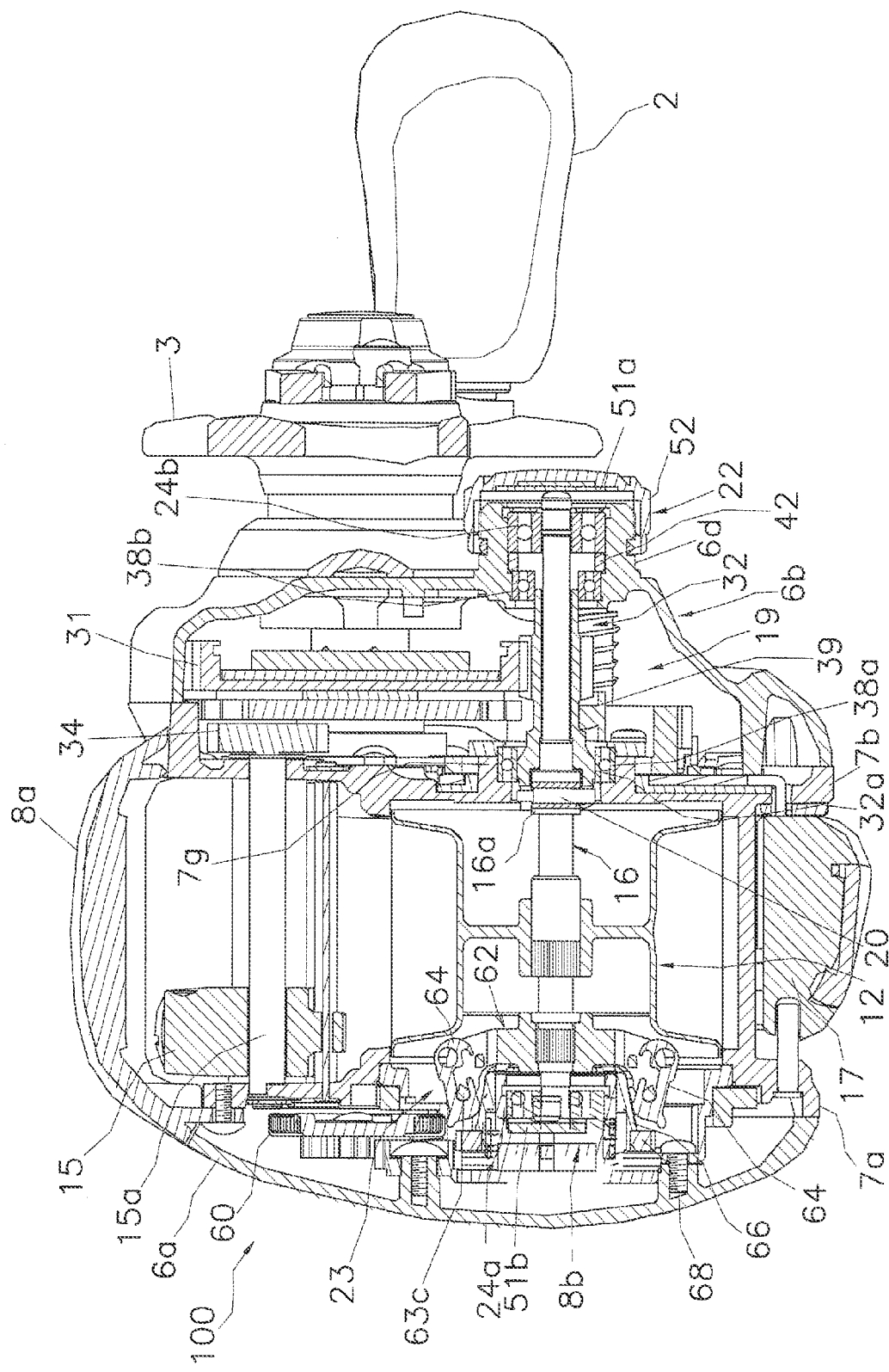
FIG. 5 is a cross-sectional view of the dual-bearing reel taken along a cutaway line V-V in FIG. 2.

As illustrated in FIGS. 3, 4 and 5, the spool 12, a level winding mechanism 15, and a clutch operating member 17 are disposed between the first side plate 7a and the second side plate 7b. The level winding mechanism 15 is configured to uniformly wind the fishing line about the spool 12. The clutch operating member 17 functions as a thumb pad in thumbing the fishing line. The clutch operating member 17 is provided for performing an operation of switching the clutch mechanism 13 between a coupled state and a decoupled state by pivoting about the spool shaft 16. The clutch operating member 17 is configured to pivot between a clutch-on position and a clutch-off position. In FIG. 2, the clutch-on position is depicted with a solid line, whereas the clutch-off position is depicted with a dashed two-dotted line.

The rotation transmission mechanism 18, the clutch mechanism 13, a clutch control mechanism 19, the drag mechanism 21, and a casting control mechanism 22 are disposed between the second side plate 7b and the second side cover 6b. The rotation transmission mechanism 18 is a mechanism configured to transmit the rotation of the handle 2 to the spool 12 and the level winding mechanism 15. The clutch control mechanism 19 is a mechanism configured to couple/decouple and control the clutch mechanism 13 in response to the operation of the clutch operating member 17. As illustrated in FIG. 6, the clutch control mechanism 19 has a heretofore known structure including a clutch yoke 39, a clutch cam 44, and a clutch plate 45. The casting control mechanism 22 is a brake mechanism configured to regulate resistive force to be applied during rotation of the spool 112. Further, a spool brake device 23, which is configured to brake the spool 12 by centrifugal force, is disposed between the first side plate 7a and the first side cover 6a. The spool brake device 23 is a device for inhibiting occurrence of backlash in casting.

Spool and Spool Shaft

As illustrated in FIG. 4, the spool 12 has a bobbin trunk 12a, a pair of right and left flanges 12b, and a boss 12c. The bobbin trunk 12a is a tubular part that the fishing line is wound about the outer periphery thereof. The flanges 12b are integrally formed on the both axial ends of the bobbin trunk 12a, while being protruding radially outwards. The boss 12c is fixed onto the spool shaft 16 by an arbitrary fixation method such as press-fitting. The spool 12 is thereby coupled to the spool shaft 16 while being unitarily rotatable therewith.

As illustrated in FIGS. 4 and 5, the spool shaft 16 extends outwards of the second side cover 6b, while penetrating through the second side plate 7b. One end of the spool shaft 16 is rotatably supported by the bearing 24a accommodated in the bearing accommodation portion 8c of the shaft support part 8b. On the other hand, the other end of the spool shaft 16 is rotatably supported by a bearing 24b within the fourth boss 6d formed on the second side cover 6b. Thus, the spool shaft 16 is supported by the reel unit 1 through the bearings in two positions.

The spool shaft 16 penetrates through the second boss 7g of the second side plate 7b. A clutch pin 20, which forms a part of the clutch mechanism 13, is fixed to a part of the spool shaft 16, i.e., the part penetrating the second boss 7g. The clutch pin 20 is an exemplary clutch part forming a part of the clutch mechanism 13. The clutch pin 20 penetrates through the spool shaft 16 along the radial direction, while the both ends thereof are radially protruding from the spool shaft 16. Similarly to a portion of the spool shaft 16 onto which the spool 12 is fixed, a pin penetrating portion 16a of the spool shaft 16, i.e., a portion that the clutch pin 20 penetrates therethrough, is formed with a large diameter.

Rotation Transmission Mechanism

As illustrated in FIG. 3, the rotation transmission mechanism 18 includes the drive shaft 30, a drive gear 31, the pinion gear 32 (see FIGS. 4, 5 and 6), a first gear 33, and a second gear 34, The handle 2 is coupled to the drive shaft 30 while being unitarily rotatable therewith. The drive gear 31 is mounted to the drive shaft 30. The pinion gear 32 is meshed with the drive gear 31. The first gear 33 is coupled to the drive shaft 30 while being unitarily rotatable therewith. The second gear 34 is meshed with the first gear 33. The second gear 34 is provided for reciprocating the level winding mechanism 15 right and left in conjunction with the rotation of the handle 2.

As illustrated in FIGS. 3 and 6, the drive shaft 30 is made of, for instance, stainless alloy, and has a brimmed portion 30a with a large diameter. The drive shaft 30 is rotatably supported by the reel unit 1 through a bearing 43 and a one-way clutch 40. The bearing 43 is attached to the first boss 7f of the second side plate 7b. The one-way clutch 40 is attached to the third boss 6c of the second side cover 6b. The drive shaft 30 is allowed to be rotated only in the fishing-line winding direction by the one-way clutch 40 of a roller type. A ratchet wheel 36, which functions as a drag receiver member for receiving the drag force of the drag mechanism 21, is mounted onto the drive shaft 30 while being unitarily rotatable therewith. The ratchet wheel 36 is disposed between the drive gear 31 and the brimmed portion 30a. The ratchet wheel 36 functions not only as the drag receiver member but also as a clutch returning mechanism configured to return the clutch mechanism 13 from a clutch-off state to a clutch-on state. Further, the ratchet wheel 36 functions as a pawl-type one-way clutch disposed in parallel with the one-way clutch 40.

As illustrated in FIG. 3, the drive gear 31 is rotatably mounted to the drive shaft 30. A drag plate 37 of the drag mechanism 21 is also mounted to the drive shaft 30, while being unitarily rotatable therewith. Further, a drag nut 3a of the star drag 3 is screwed onto the drive shaft 30. The handle 2 is mounted to the tip end of the drive shaft 30, while being unitarily rotatable therewith. Further, a nut 53 is screwed onto the tip end of the drive shaft 30 in order to fix the handle 2 to the drive shaft 30. The first gear 33 is mounted onto the base end of the drive shaft 30, while being unitarily rotatable therewith. As illustrated in FIG. 5, the second gear 34 is coupled to a warm shaft 15a of the level winding mechanism 15, while being unitarily rotatable therewith.

As illustrated in FIGS. 3 and 4, the pinion gear 32 is a tubular member made of metal (e.g., stainless alloy or brass alloy), and has a stepped through hole 32h that the spool shaft 16 penetrates through the center thereof. The both ends of the pinion gear 32 are rotatably supported by the reel unit 1. Specifically, one end of the pinion gear 32 is rotatably supported by a bearing 38a attached to the second boss 7g of the second side plate 7b, whereas the other end of the pinion gear 32 is rotatably supported by a bearing 38b attached to the fourth boss 6d of the second side cover 6b. The bearing 38a is an exemplary first bearing, whereas the bearing 38b is an exemplary second bearing. Thus, the both ends of the pinion gear 32 are supported by the reel unit 1. The pinion gear 32 thereby becomes unlikely to be slanted and does not make contact with the spool shaft 16. Accordingly, the rotation speed of the spool 12 is unlikely to be decelerated in free rotation.

Figure 7:
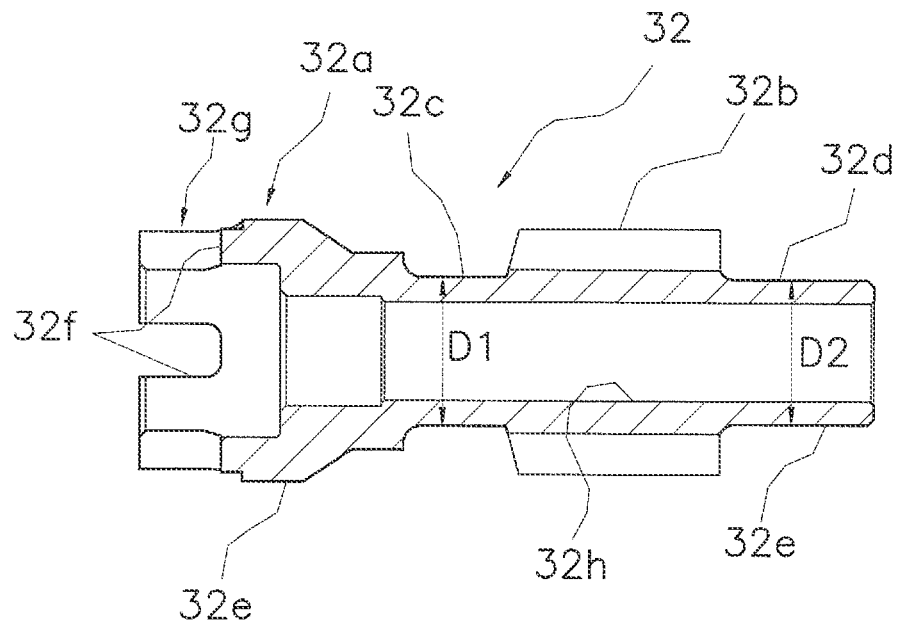
FIG. 7 is a cross-sectional view of a pinion gear.
Figure 8:
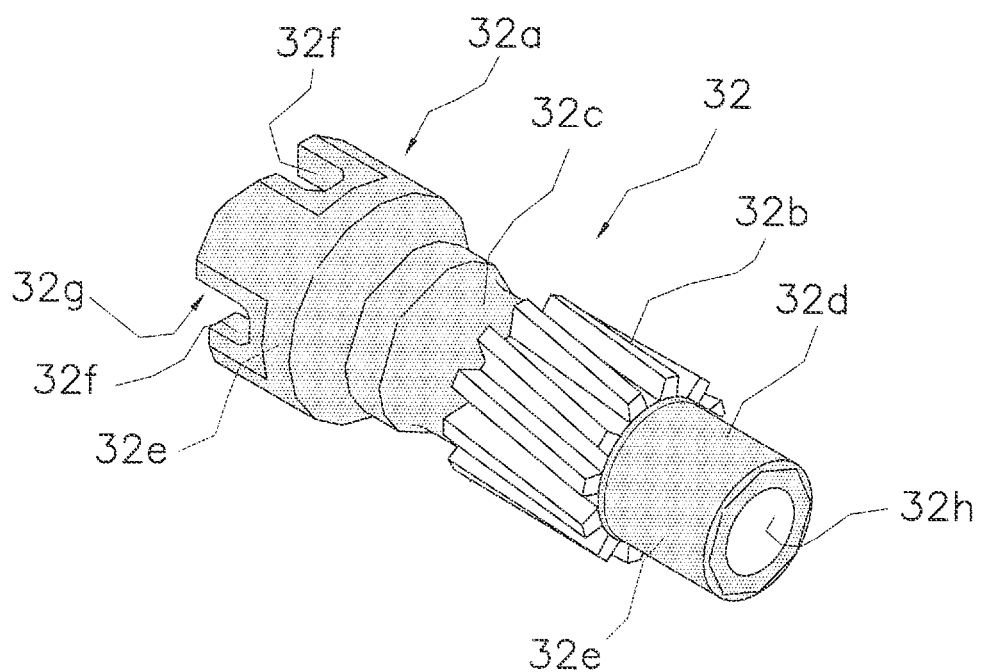
FIG. 8 is a perspective view of the pinion gear.

Further, the pinion gear 32 is supported by the reel unit 1 through the bearings 38a and 38b, while being movable in the spool shaft direction. As illustrated in FIGS. 6, 7 and 8, the pinion gear 32 has a first support portion 32a, a gear portion 32b, a narrowed portion 32c, a second support portion 32d, and a plated coating 32e. The narrowed portion 32c is an exemplary clutch control portion.

The first support portion 32a is disposed nest to the gear portion 32b on one side of the gear portion 32b. The first support portion 32a is supported by the second boss 7g of the second side plate 7b through the bearing 38a, while being rotatable and axially movable. The first support portion 32a has a clutch engaging portion 32g. The clutch engaging portion 32g has a plurality of engaging grooves 32f. The clutch pin 20 is engaged with any of the engaging grooves 32f. The engaging grooves 32f are formed along radial directions. For example, two engaging grooves 32f are formed along radial directions, while intersecting with each other at an angle of 90 degrees.

The gear portion 32b is disposed away from the first support portion 32a at an interval. The gear portion 32b can be meshed with the drive gear 31. The gear portion 32b is formed by an arbitrary type of machining such as gear cutting, after a blank (the pinion gear 32) is finished being processed except for the gear portion 32h and the plated coating 32e is then formed on the blank with the through hole 32h being closed. Therefore, the plated coating 32e is not formed on the gear portion 32b.

The narrowed portion 32c is disposed between the first support portion 32a and the gear portion 32b. The outer diameter (D1) of the narrowed portion 32c is smaller than that of the first support portion 32a. However, the outer diameter (D1) of the narrowed portion 32c is larger than that (D2) of the second support portion 32d (i.e., D1>D2). Thus, the outer diameter D1 of the narrowed portion 32c disposed between the gear portion 32b to be meshed with the drive gear 31 and the clutch engaging portion 32g to be coupled to the spool shaft 16 is larger than the outer diameter D2 of the second support portion 32d. Therefore, the pinion gear 32 is enhanced in its stiffness and its rotation transmission efficiency.

The clutch yoke 39, which forms a part of the clutch control mechanism 19, is engaged with the narrowed portion 32c. The clutch yoke 39 is configured to be located in an off-position depicted in FIG. 4 when the clutch operating member 17 is located in a clutch-off position depicted with a dashed two-dotted line in FIG. 2. On the other hand, the clutch yoke 39 is configured to be moved to an on-position depicted in FIG. 5 together with the pinion gear 32 when the clutch operating member 17 is located in a clutch-on position depicted with a solid line in FIG. 2. It should be noted that the on-position depicted in FIG. 5 is located closer to the spool 12 than the off-position depicted in FIG. 4 is, and in FIG. 5, the on-position is located on the left side of the off-position. Thus, the clutch pin 20 is engaged with any of the engaging grooves 32f, and the clutch mechanism 13 is set to be in the clutch-on state. Therefore, the clutch mechanism 13 is formed by the clutch pin 20 and the pinion gear 32. It should be noted that the clutch yoke 39 is urged to the on-position by a pair of coil springs 35 (see FIG. 6).

As described above, the pinion gear 32 forms a part of the rotation transmission mechanism 18, and is configured to be rotated in conjunction with the handle 2 for transmitting the rotation of the handle 2 to the spool 12 and be reciprocated along the spool shall 16 direction in response to the operation of the clutch operating member 17. The outer diameter D1 of the narrowed portion 32c is larger than the outer diameter D2 of the second support portion 32d. Therefore, the pinion gear 32 is enhanced in its stiffness, and becomes unlikely to be distorted. The pinion gear 32 is thereby enhanced in its rotation transmission efficiency.

The second support portion 32d is disposed next to the gear portion b on the side of the gear portion 32b. The second support portion 32d is supported by the fourth boss 6d of the second side cover 6b through the bearing 38b, while being rotatable and axially movable. The bearing 38b is disposed together with the bearing 24b supporting the spool shaft 16 within the fourth boss 6d, while a spacer 42 is interposed therebetween.

Figure 9:
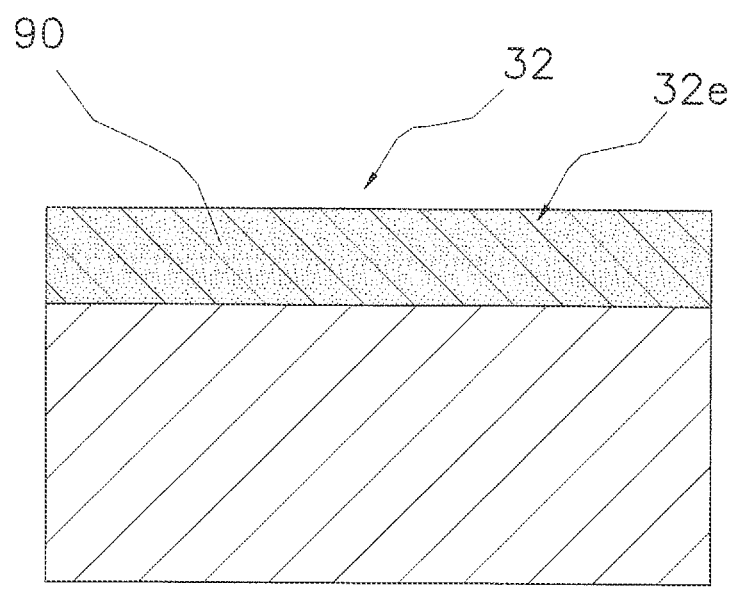
FIG. 9 is a schematic cross-sectional view of a plated coating.

As illustrated in FIGS. 7 and 8, the plated coating 32e is formed on at least the outer peripheral surface of the first support portion 32a. In the present exemplary embodiment, the plated coating 32e, as depicted with bold lines in FIG. 7 and depicted with dots in FIG. 8, is formed not only on the outer peripheral surface of the first support portion 32a but also on the outer peripheral surface of the narrowed portion 32c, that of the second support portion 32d and that of the engaging grooves 32f. As illustrated in FIG. 9, the plated coating 32e is a fluororesin contained electroless nickel plated coating 90. The fluororesin contained electroless nickel plated coating 90 is a composite plated coating formed by substantially uniformly dispersing particles of fluororesin into nickel plating solution and causing eutectoid reactions between them. The fluororesin used for the fluororesin contained electroless nickel plated coating 90 is one selected from the group consisting of polytetrafluoroethylene (PTFE), polychlorotrifluoroethylene (PCTFE), polyvinylidene fluoride (PVDF), polyvinyl fluoride (PVF), perfluoroalkoxy (PFA), fluorinated ethylene propylene (FEP), polyethylene tetrafluoroethylene (ETFE) and polyethylene chlorotrifluoroethylene (ECTFE). The fluororesin is herein preferably polytetrafluoroethylene (PTFE). It should be noted that FIG. 9 schematically depicts fluororesin with dots. The thickness of the fluororesin contained electroless nickel plated coating 90 falls in a range of 2 to 20 µm, for instance, and preferably falls in a range of 5 to 15 µm. The eutectic amount of fluororesin is, for instance, 1.5 to 10 weight percent of the entire plating solution.

In producing the pinion gear 32 thus structured, a tubular metal blank is machined for forming the first support portion 32a including the clutch engaging portion 32g, the narrowed portion 32c, the second support portion 32d, and the through hole 32h except for the gear portion 32b to be machined by gear cutting. The machined blank is then submerged into a plating tank while the through hole 32h is closed. Subsequently, an electroless plating process is performed for the submerged blank. After the electroless plating process, the gear portion 32b is machined by gear cutting.

Drag Mechanism

In the clutch-on state, the drag mechanism 21 is configured to brake the rotation of the spool 12 in the fishing-line releasing direction through the drive gear 31. The drag force of the drag mechanism 21 is regulated by the star drag 3. As illustrated in FIGS. 3 and 6, the rotation of the handle 2 and the pressing force of the star drag 3 are transmitted to the drag mechanism 21 through an inner race 40a of the one-way clutch 40. The drag mechanism 21 includes the ratchet wheel 36 and the drag plate 37 (see FIG. 3). The drag plate 37 is coupled to the inner race 40a while being unitarily rotatable therewith. To make the drive gear 31 smoothly slide against adjacent members in drag activation, a first drag washer 41a is attached between the drag plate 37 and the drive gear 31, while a second drag washer 41b is attached between the drive gear 31 and the ratchet wheel 36. The first and second drag washers 41a and 41b are made of either felt or graphite.

Casting Control Mechanism

As illustrated in FIGS. 4 and 5, the casting control mechanism 22 includes a first friction plate 51a, a second friction plate 51b and a brake cap 52. The first friction plate 51a and the second friction plate 51b are abutted to the both ends of the spool shaft 16 from axially outside of the spool shaft 16. The brake cap 52 is a member for regulating abutting pressure of the first and second fiction plates 51a and 51b against the spool shaft 16. The first friction plate 51a is disposed inside the brake cap 52. The brake cap 52 is screwed onto the outer peripheral surface of the fourth boss 6d. The second friction plate 51b is attached to the inside of the shaft support part 8b.

Spool Brake Device

As illustrated in FIG. 5, the spool brake device 23 includes a rotary member 62, a plurality of (e.g., six) brake shoes 64, a brake drum 66, and a moving mechanism 68. The spool brake device 23 is mounted to the spool shaft 16 and the shaft support part 8b. The plural brake shoes 64 are elastically engaged with the rotary member 62 while being pivotable and detachable. The brake drum 66 is disposed radially inwards of the brake shoes 64, while the outer peripheral surface thereof is contactable with the pivotable brake shoes 64. The moving mechanism 68 can position the brake shoes 64 and the brake drum 66 in the axial direction of the spool shaft 16 while the brake shoes 64 and the brake drum 66 are axially movable relatively to each other.

The rotary member 62 is a roughly circular member made of synthetic resin (e.g., polyamide resin, polyacetal resin, etc.). The rotary member 62 is fixed onto the spool shaft 16 by press-fitting. The rotary member 62 is axially positioned by the spool shaft 16. Further, the rotary member 62 is configured to be rotated in conjunction with the rotation of the spool 12 while being fixed onto the spool shaft 16. When the spool 12 is rotated, centrifugal force acts on the brake shoes 64. Each brake shoe 64 thereby pivots about a pivot shaft 63c in the counterclockwise direction in FIG. 5. Then, the spool 12 is braked by friction between the brake shoes 64 and the brake drum 66. At this time, the braking force depends on the gravity center position and the pivot angle of each brake shoe 64 in the contact position. Therefore, the braking force can be regulated by causing the moving mechanism 68 to regulate the position of the brake drum 66. It should be noted that the position of the brake drum 66 can be regulated by turning an operating member 60.

In the pinion gear 32 of the dual-bearing reel 100 thus structured, the plated coating 90 is formed on the outer peripheral surface of the first support portion 32a that is supported by the second boss 7g of the second side plate 7b of the reel unit 1 through the bearing 38a while being rotatable and axially movable. The surface roughness of the plated coating 90 is smaller than that of a machined surface. Therefore, slide resistance can be reduced between the inner peripheral surface of the bearing 38a and the first support portion 32a. Slide resistance can be herein reduced between the bearing 38a and the first support portion 32a without using a member for reducing slide resistance such as a collar. Accordingly, the pinion gear 32, which is supported by the reel unit 1 through the bearing 38a, can be smoothly moved in the axial direction without increase in size of the bearing 38a and deterioration in strength of the pinion gear 32.

Features

The aforementioned exemplary embodiment can be expresses as follows.

(A) The pinion gear 32 of the dual-bearing reel 100 is meshed with the drive gear 31 configured to transmit the rotation of the handle 2 rotatably mounted to the reel unit 1 of the dual-bearing reel 100 to the spool 12. The pinion gear 32 functions also as the clutch mechanism 13 by moving in the spool shaft direction. The pinion gear 32 has the first support portion 32a, the gear portion 32b, the narrowed portion 32c, and the plated coating 32e. The first support portion 32a is disposed next to the gear portion 32b on one side of the gear portion 32b, and is supported by the reel unit 1 through the bearing 38a so as to be rotatable and axially movable. The gear position 32b is disposed away from the first support portion 32a at an interval, and is allowed to be meshed with the drive gear 31. The narrowed portion 32c is disposed between the first support portion 32a and the gear portion 32b, and has an outer diameter smaller than that of the first support portion 32a and that of the gear portion 32b. The plated coating 32e is formed on at least the outer peripheral surface of the first support portion 32a.

In the pinion gear 32, the plated coating 32e is formed on the outer peripheral surface of the first support portion 32a that is supported by the reel unit 1 through the bearing 38a while being rotatable and axially movable. The surface roughness of the plated coating 32e is smaller than that of a machined surface. Slide resistance can be thereby reduced between the inner peripheral surface of the bearing 38a and the first support portion 32a. Slide resistance can be herein reduced between the bearing 38a and the first support portion 32a without using a member for reducing slide resistance such as a collar. Accordingly, it is possible to axially and smoothly move the pinion gear 32 supported by the reel unit 1 through the bearing 38a without increase in size of the bearing 38a and deterioration in strength of the pinion gear 32.

(B) The pinion gear 32 can further have the second support portion 32d. The second support portion 32d is disposed next to the gear portion 32b on the other side of the gear portion 32b while being disposed on the opposite side of the narrowed portion 32c through the gear portion 32b. The second support portion 32d is supported by the reel unit 1 through the bearing 38b so as to be rotatable and axially movable. Further, the plated coating 32e can be further formed on the outer peripheral surface of the second support portion 32d.

In this case, the pinion gear 32 is supported at the both ends thereof, while being rotatable and axially movable. Therefore, the pinion gear 32 becomes unlikely to be slanted, and the rotation transmission efficiency thereof is enhanced. Further, the plated coating 32e is also formed on the second support portion 32d. Therefore, slide resistance of the pinion gear 32 is not increased even when the pinion gear 32 is supported at the both ends thereof. Accordingly, the pinion gear 32 can be further smoothly moved in the axial direction.

(C) The first support portion 32a can have the clutch engaging portion 32g to be engaged with the clutch pin 20 mounted to the spool shaft 16. In this case, the clutch engaging portion 32g is formed in the first support portion 32a disposed next to the gear portion 32b on one side of the gear portion 32b, i.e., the end closer to the spool 12. Therefore, the clutch mechanism 13 can be easily structured.

(D) The clutch engaging portion 32g can have the engaging grooves 32f to be engaged with the clutch pin 20. And, the plated coating 32e can be further formed on the engaging grooves 32f. In this case, the plated coating 32e is also formed on the engaging grooves 32f to be engaged with the clutch pin 20. Therefore, slide resistance can be reduced between the clutch pin 20 and the engaging grooves 32f, and an action of switching between the coupled state and the decoupled state can be smoothly performed.

(E) The gear portion 32b can be formed by gear cutting after the plated coating 32e is formed. In this case, a part of a blank, which is to be formed as the gear portion 32b, is processed by plating before gear cutting. Therefore, the blank can be easily processed by electroless plating, which is performed by submerging the blank into a plating tank, without masking the gear portion 32b. Accordingly, the plated coating 32e can be easily formed with a constant film thickness.

(F) The outer diameter D1 of the narrowed portion 32c can be larger than the outer diameter D2 of the second support portion 32d. In this case, the outer diameter D1 of the narrowed portion 32c disposed between the gear portion 32b meshed with the drive gear 31, and the clutch engaging portion 32g coupled to the spool shaft 16 is larger than the outer diameter D2 of the second support position 32d. Therefore, the pinion gear 32 can be enhanced in its stiffness and its rotation transmission efficiency.

(G) A plated coating 32e can be a fluororesin contained electroless nickel plated coating. In this case, the outer peripheral surface with a small surface roughness can be obtained by the plated coating 32e. Further, slide resistance can be further reduced by fluororesin. Yet further, corrosion resistance can be enhanced by fluororesin plating, and salt content in the seawater can be prevented from being easily adhered between the surface of the pinion gear 32 and the bearing 38a.

(H) The dual-bearing reel 100 is a reel configured to forwardly reel out the fishing line. The dual-bearing reel 100 includes the reel unit 1, the handle 2, the spool 12 for winding the fishing line, the spool shaft 16, the rotation transmission mechanism 18, the clutch mechanism 13, the bearing 38a, and the bearing 38b. The handle 2 is rotatably mounted to a lateral part of the reel unit 1. The spool 12 is rotatably supported by the reel unit 1. The spool shaft 16 is a member onto which the spool 12 is mounted. The rotation transmission mechanism 18 includes the drive gear 31 configured to be rotatable in conjunction with the handle 2 and the aforementioned pinion gear 32. The rotation transmission mechanism 18 is provided for transmitting the rotation of the handle 2 to the spool 12. The clutch mechanism 13 is allowed to be set in the coupled state and the decoupled state. The coupled state causes the handle 2 and the spool 12, to be coupled to each other. The decoupled state causes the handle 2 and the spool 12 to be decoupled from each other. The bearing 38a is mounted to the reel unit 1 and serves to support the first support portion 32a in a rotatable and axially movable state. The bearing 38b is mounted to the reel unit 1 and serves to support the second support portion 32d in a rotatable and axially movable state.

The present dual-bearing reel can achieve the advantageous effects achieved by the aforementioned pinion gear.

Other Exemplary Embodiments

An exemplary embodiment of the present invention has been explained above. However, the present invention is not limited to the aforementioned exemplary embodiment, and a variety of changes can be made without departing from the scope of the present invention. Especially, a plurality of exemplary embodiments and modifications described in the present specification can be arbitrarily combined on an as-needed basis.

(a) In the aforementioned exemplary embodiment, the pinion gear 32 is supported by the reel unit 1 through the two bearings, i.e., the bearing 38a as the first bearing and the bearing 38b as the second bearing, while being rotatable and axially movable. However, the present invention is not limited to the structure. The present invention is also applicable to such a structure that a pinion gear is supported only by a first bearing while being rotatable and axially movable.

(b) In the aforementioned exemplary embodiment, the outer diameter of the narrowed portion 32c (clutch control portion) is larger than that of the second support portion 32d. However, contrary to the structure, the outer diameter of the narrowed portion 32 (clutch control portion) can be smaller than that of the second support portion 32d.

(c) In the aforementioned exemplary embodiment, the drive gear 31 is rotatably mounted to the drive shaft 30. However, the present invention is also applicable to such a dual-bearing reel that a drive gear is mounted to a drive shall while being unitarily rotatable therewith.

(d) In the aforementioned exemplary embodiment, the through hole 32h is closed in plating. However, a plated coating can be formed onto the through hole 32h. In this case, the sliding performance of the pinion gear 32 can be also enhanced, especially when chances are that the through hole 32h makes contact with the spool shall 16 without the second bearing being provided.

(e) In the aforementioned exemplary embodiment, the composite plated coating, formed by dispersing particles of fluororesin into a solution and causing eutectoid reactions between them, has been exemplified as a fluororesin contained electroless nickel plated coating. In the present invention, however, the fluororesin contained electroless nickel plated coating is not limited to the above. For example, the fluororesin contained electroless nickel plated coating can be a composite plated coating that is formed by incorporating fluororesin into a multi-porous coating made of nickel-phosphorus (Ni—P) precipitated in a particle state by thermal treatment. In this case, the hardness of the composite plated coating is enhanced, although the cost of forming the composite plate coating is increased. Alternatively, the fluororesin contained electroless nickel plated coating can be any other suitable nickel plated coating containing fluororesin.

(f) Members, which include the clutch yoke and the clutch cam, can be made of metal, and can be further treated by fluororesin contained plating. In this case, any suitable shape and method can be employed for the clutch yoke and the clutch cam without particular limitations.

(g) In the aforementioned exemplary embodiment, the present invention has been explained by exemplifying a low-profile dual-bearing reel. However, the present invention is also applicable to pinion gears for round dual-bearing reels, electric reels and single-bearing reels.

Advantageous Effects of Invention

According to the present invention, slide resistance can be reduced between the bearing and the first support portion without using a member for reducing the slide resistance such as a collar. Accordingly, it is possible to axially and smoothly move the pinion gear supported by the reel unit through the bearing without increase in size of the bearing and deterioration in strength of the pinion gear.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A pinion gear for a dual-bearing reel, the pinion gear being configured to be meshed with a drive gear, the drive gear being configured to transmit rotation of a handle rotatably mounted to a reel unit of the dual-bearing reel to a spool, the pinion gear comprising:
   a first support portion being supported by the reel unit through a first bearing, the first support portion being rotatable and axially movable with respect to the first bearing;
   a gear portion being disposed away from the first support portion at an interval, the gear portion being configured to be meshed with the drive gear and being formed by gear-cutting after a plated coating is formed, the first support portion being disposed next to the gear portion on a first side of the gear portion;
   a clutch control portion being disposed between the first support portion and the gear portion, the clutch control portion including an outer diameter smaller than an outer diameter of the first support portion and an outer diameter of the gear portion; and
   the plated coating being formed on at least an outer peripheral surface of the first support portion.

2. The pinion gear for the dual-bearing reel according to claim 1, further comprising
   a second support portion being disposed next to a gear portion on a second side being opposite to the first side of the gear portion, the second support portion being supported by the reel unit through a second bearing, the second support portion being rotatable and axially movable with respect to the second bearing, wherein
   the gear portion is disposed between the second support portion and the clutch control portion, and
   the plated coating is further formed on an outer peripheral surface of the second support portion.

3. The pinion gear for the dual-bearing reel according to claim 1, wherein
   the first support portion includes a clutch engaging portion being configured to be engaged with a clutch part, and
   the clutch part is mounted to a spool shaft.

4. The pinion gear for the dual-bearing reel according to claim 3, wherein
   the clutch engaging portion includes an engaging groove being configured to be engaged with the clutch part, and
   the plated coating is further formed on the engaging groove.

5. The pinion gear for the dual-bearing reel according to claim 1, wherein
   the clutch control portion includes an outer diameter larger than an outer diameter of the second support portion.

6. The pinion gear for the dual-bearing reel according to claim 1, wherein
   the plated coating is an electroless nickel plated coating containing a fluororesin.

7. A dual-bearing reel being configured to forwardly reel out a fishing line, the dual-bearing reel comprising:
   a reel unit having a lateral part;
   a handle being rotatably mounted to the lateral part;
   a spool being configured to wind the fishing line and being rotatably supported by the reel unit;
   a spool shaft onto which the spool is mounted;
   a rotation transmission mechanism being configured to transmit rotation of the handle to the spool, the rotation transmission mechanism including a drive gear being configured to be rotatable in conjunction with the handle and the pinion gear according to claim 2;
   a clutch control mechanism being configured to control a coupling of the handle and the spool, the handle being coupled to the spool in a coupled state, the handle being decoupled from the spool in a decoupled state;
   the first bearing being mounted to the reel unit,
   the second bearing being mounted to the reel unit.

* * * * *